(12) United States Patent
King et al.

(10) Patent No.: US 8,046,237 B1
(45) Date of Patent: Oct. 25, 2011

(54) METHOD, MEDIUM, AND SYSTEM FOR TAG FORUM INTERACTION IN RESPONSE TO A TAG SCORE REACHING A THRESHOLD VALUE

(75) Inventors: Joseph King, Seattle, WA (US); Waqas Ahmed, Bellevue, WA (US); Russell A. Dicker, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 1097 days.

(21) Appl. No.: 11/844,223

(22) Filed: Aug. 23, 2007

(51) Int. Cl.
*G06Q 30/00* (2006.01)
(52) U.S. Cl. .......................................................... 705/1
(58) Field of Classification Search ............... 705/1, 203; 707/3, 10, 102; 709/203
See application file for complete search history.

(56) References Cited

U.S. PATENT DOCUMENTS

| | | | | |
|---|---|---|---|---|
| 2004/0111467 | A1* | 6/2004 | Willis | 709/203 |
| 2006/0218179 | A1* | 9/2006 | Gardner et al. | 707/102 |
| 2007/0043583 | A1* | 2/2007 | Davulcu et al. | 705/1 |
| 2007/0143298 | A1* | 6/2007 | Surendran et al. | 707/10 |
| 2008/0222100 | A1* | 9/2008 | Chiu | 707/3 |

OTHER PUBLICATIONS

Tag Forums Generated and Linked on Tag Page, Release Date Sep. 2006, 1 pg.*
Tag Forums Generated and Linked on Tag Page, Release date Sep. 2006, 1 pg.

* cited by examiner

*Primary Examiner* — Yogesh C Garg
*Assistant Examiner* — Matthew Zimmerman
(74) *Attorney, Agent, or Firm* — Lee & Hayes, PLLC

(57) ABSTRACT

Creation and placement of tag forums for tags enables a user to discuss aspects of both tags and elements associated with the tags, and further enables a user to view discussions from other users. The tag forum may be generated and/or placed based in part on user interaction or other factors related to the elements and the tags. Tag forums may be placed on, for example, selective tag web pages or associated element web pages within a website, among other possibilities.

17 Claims, 9 Drawing Sheets

METHOD, MEDIUM, AND SYSTEM FOR TAG FORUM INTERACTION IN RESPONSE TO A TAG SCORE REACHING A THRESHOLD VALUE

BACKGROUND

Unlike traditional brick-and-mortar businesses, companies utilizing e-commerce websites often do not have a physical store or location where a salesperson can help both novice and knowledgeable customers find sought-after products. Instead, a customer navigating an e-commerce website typically attempts to identify a product that meets the customer's needs. Even a customer with considerable experience navigating e-commerce websites sometimes experiences difficulty in choosing a product from among tens or hundreds of similar products. For novice customers, meanwhile, the task of shopping online via the web can be unproductive and even frustrating. In response to these difficulties, these companies continually strive to make their e-commerce websites more dynamic, compelling, informative, and easier for users to navigate and locate products and related information. One way to improve a customer's experience includes providing forums (or discussion boards) that allow customers to exchange information with other people via dialogue in a discussion. The ever-enlarging product catalog makes forums helpful when a customer tries to distinguish between products, seek out impartial advice, learn more about a product or category, or obtain other information.

One way of creating forums is through selection of forum topics by an editor or administrator. However, this approach is inherently burdensome for an editor, particularly when the editor supports a large product catalog. For example, each forum may require manual creation and placement of the forum at useful locations throughout a website to provide adequate customer accessibility to the forums. A large product catalog may support tens of thousands of forums and thus require intensive manual interactions by an editor to maintain optimally placed forums within the website.

Accordingly, among other potential improvements, there remains a need to improve forum creation and placement on e-commerce websites.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
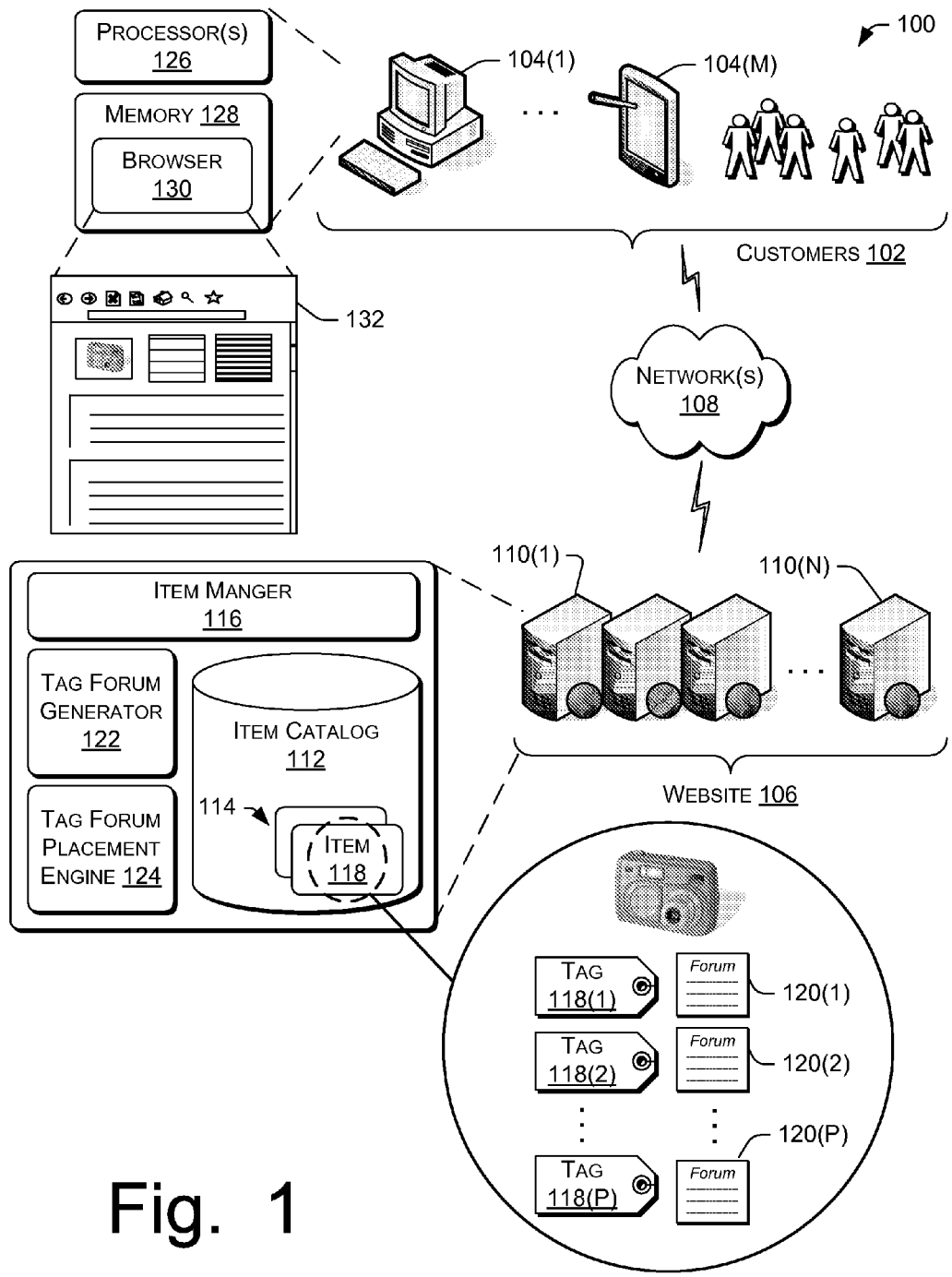
FIG. 1 illustrates an example architecture for implementing tag forums associated with tags that are included within an electronic catalog of items. The architecture includes multiple clients coupled via a network to a server system that hosts the electronic catalog.

Embodiments of the present disclosure are directed to, among other things, tag forums for tags associated with particular elements and made remotely available, such as over a wide area network such as the Internet or available by another distributed communication. As an overview, elements may include products, services, sellable units, user profiles, customer-created content (e.g., artwork), or anything else to which a tag may be associated. Tagging, meanwhile, enables a community of users or other entities to define and assign different tags to the elements. Tags are user-generated metadata about the elements. In other words, tags are pieces of information separate from, but related to, the elements. In a collaborative environment, the tags are descriptors that may be freely chosen by different users to characterize or otherwise describe attributes of the elements, rather than having the description controlled by a centralized classification process. The tags can specify properties of an element that may not otherwise be obvious from the element itself and/or which may have special meaning only to the user or a subset of users. Once assigned to elements, the tags may then be used to locate the elements, for example, via a tag search. Although embodiments are described as having alpha-numeric tags, other types of tags can be used, including icons, photos, and/or video clips, for example.

In some implementations, a user may discover one or more elements within an electronic catalog and associated with a particular tag. In some embodiments, each tag may have an associated tag web page including elements associated with the tag. For example, in some embodiments, a list of elements associated with the tag may be presented to the user from a tag web page.

The tag web page may further include a tag forum. A forum may be an online discussion board where users may exchange messages (usually text-based) via posts or entries, typically continued in a dialogue format on the message board. In some instances, the forum may facilitate exchanging and viewing images (e.g., videos, icons, or other graphical imagery) or exchanging and/or playing audio clips. Users may either contribute to the discussion or they may read other people's entries to gain insight on the discussion topic. The tag forum may have an associated tag forum web page to display the tag forum and allow users to interact on the tag forum. In some aspects, users may exchange files or other data via a forum, either using a message board or other response posting environment.

The tag forum may include one or more discussions. Each discussion may be created, in whole or in part, based on topics related to the element and the particular tag associated with the element. As a result, the discussions may be related to aspects of the tag, including the elements associated with the tag. Therefore, the tag forum may be a general forum for discussing an array of elements, each sharing a common tag.

A tag forum may allow users to participate in general discussions related to the tag without being limited to traditional item categories or item pages.

In other embodiments, the tag forums may surface to element web pages, or other website addresses within an electronic catalog. For example a tag may have a strong association with a particular element, thus it may be desirable to place a hyperlink to the tag forum on the element web page. In further embodiments, tag forums may be selectively placed throughout an electronic catalog website (automatically or by an administrator) to strategically allow customers to access forums that may pertain to their interests while avoiding over-placement of the tag forums which may clutter websites and distract customers from more relevant information or services.

For purposes of discussion, tag forums are described in the context of an item catalog hosted by a merchant website. One illustrative implementation of this context is provided below. However, it should be appreciated that the described tag forum generation and placement techniques may be implemented in other contexts. Moreover, other tag forum generation and placement techniques may be performed by the illustrated architecture.

Illustrative *System Architecture*

FIG. 1 illustrates an example architecture 100 for implementing tag forums associated with tags that are included within an electronic catalog of items. In the architecture 100, the customers 102 may utilize user computing devices 104 (1), . . . , 104(M) to access a website 106 via a network 108. The network 108 represents any one or combination of multiple different types of networks, such as cable networks, the Internet, and wireless networks.

One or more servers 110(1), . . . , 110(N), perhaps arranged in a cluster or as a server farm, host the website 106 or another type of information server. Other server architectures may also be used to host the website 106. The website 106 is capable of handling requests from many users and serving, in response, various web pages that can be rendered at the user computing devices 104(1)-(M). The website 106 can be any type of website that supports user interaction, including online retailers, informational sites, social networking sites, blog sites, search engine sites, news and entertainment sites, and so forth.

In the illustrative environment, the website 106 represents a merchant website that hosts an electronic catalog with one or more items. An item includes anything that the merchant wishes to offer for purchase, rental, subscription, viewing or some other form of consumption. In some embodiments the item may be offered for consumption by the merchant. However, in some embodiments the merchant may host items that others are selling using the merchant's website. An item can include a product, a service, a digital download, a news clip, a user profile, customer-created content, information, or some other type of sellable or non-sellable unit.

In FIG. 1, the electronic catalog is represented as an item catalog 112, which stores a collection of item records 114. The item catalog 112 is accessible, directly or indirectly, by one or more of the servers 110(1)-(N). Each item record 114, meanwhile, represents an associated item being offered for sale or other consumption on the website 106 and contains information about the associated item. For products such as books or music CDs, for example, the item record may contain a description, images of the product, author/artist names, publication data, pricing, shipping information, and so forth. For other types of items, the item record may contain different information appropriate for those items.

An item manager 116 facilitates access to and management of the item records 114 in the item catalog 112. The item manager 116 allows the website operators to add or remove items to the item catalog 112, and generally maintain control of the items offered on the website 106. When a user requests information on an item from the website 106, one or more of the servers 110(1)-(N) retrieve the item information from the item catalog 112 and serve a web page containing the information to the requesting user computing device. The item catalog 112 may therefore contain static web pages that are pre-generated and stored prior to such requests, and/or data that is used to populate dynamic web pages that are generated in response to such requests.

In addition, each item record 114 within the item catalog 112 may be associated with one or more tags. For instance, an item record 118 (illustrated as representing a camera) is shown to be associated with tags 118(1), . . . , (P). The customers 102, an operator of the website 106, or some other entity may have associated the tags 118(1)-(P) with the item record 118. By associating a tag with an item record, the tag also becomes associated with the item that the item record represents. As discussed above, the tags 118(1)-(P) may comprise pieces of information that characterize or otherwise describe attributes of the item represented by the item record 118. In some embodiments, tags may also include information that does not describe attributes of the item. For example, a user may tag an item "Mom" to indicate items that might be a good gift for the user's mother.

Each of the tags 118(1)-(P) may itself include or otherwise correspond to a respective one of the tag forums 120(1), . . . , (P). The tag forums 120(1)-(P) may include a discussion related to the tag or an item associated with the tag. The tag forums 120(1)-(P) may be strategically placed (or hyperlinked) throughout the website 106. For example, the tag forums 120(1)-(P) may be accessible from the corresponding tag web page. In addition, the tag forums may be placed on some or all of the item web pages associated with the tag. In particular, the tag forums 120(1)-(P) may be generated and/or placed by algorithms utilizing aspects of user input, tag creation, or other aspects related to tags or items, thereby permitting automatic, or partially automatic, forum generation and/or placement within the website 106. Some factors that assist in generating and placing the tag forums 120(1)-(P) may be based in part on user interaction with the tags, while other factors may not rely on user interaction. Whatever factors lead to their compilation, each of the tag forums 120(1)-(P) may be helpful to provide users additional information relating to the respective tags 118(1)-(P) or associated items 118. For instance, if a user searches within the item catalog for item records associated with the tag 118(1) (e.g., "camera"), the user may be directed to a tag page that includes the tag forum 120(1) which allows users to post comments, ask questions, or otherwise share information related to the associated tag. FIGS. 2-7 and the accompanying discussion illustrate an example of tag forum generation, placement, and presentation within an item catalog hosted by a merchant website.

FIG. 1 also depicts a tag forum generator 122, which generates tag forums 120(1)-(N) for tags 118(1)-(N) associated with item record 118. In addition, a tag forum placement engine 124 is included to place the tag forums throughout the website 106 after they have been generated by the tag forum generator 122. To generate and place tag forums, the tag forum generator 122 and tag forum placement engine 124 may utilize many factors, either individually or in any combination, some of which may indicate the relevance of a tag forum associated with a respective tag or item.

As discussed above, one or more of the customers 102 may search for items associated with a particular tag (e.g., the tag 118(1)) by conducting a search on the website 106. To search, the customers 102 may utilize the user computing devices 104(1)-(M) (also referred to as "client computers" or simply "clients"). The user computing devices 104(1)-(M) may be implemented as any number of computing devices, including as a personal computer, a laptop computer, a portable digital assistant (PDA), a mobile phone, a set-top box, a game console, and so forth. As illustrated, each user computing device is equipped with one or more processors 126 and memory 128 to store applications and data. According to some embodiments, a browser application 130 is shown stored in the memory 128 and executes on the processor 126 to provide access to the website 106. The browser 130 renders web pages served by the website 106 on an associated display. Although embodiments are described in the context of a web based system, other types of client/server-based communications and associated application logic could be used.

When a user (e.g., one of the customers 102) accesses the website 106, the user computing device 104(1) submits a request, such as in the form of a uniform resource locator (URL), to the servers 110(1)-(N). Upon receiving the request, the servers 110(1)-(N) return a web page 132 back to the requesting client computer. In the context of a merchant website, the returned web page 132 may allow the user to view or join a particular tag forum (e.g., a "camera" tag forum) to post or read information relevant to the associated tag. The user may join the forum from a tag web page or, in some instances, directly from an item web page associated with a particular tag.

In addition to a user joining a tag forum via browser 130, other software applications (browsers or otherwise) could likewise facilitate user interaction with a tag forum. The tag forums may or may not be limited to tags on the merchant's website. For instance, a tag forum may be created for tags from a second website, which could itself crawl or otherwise search one or more other websites to locate tags. The first website may then receive a listing of tags associated with particular items from the one or more other websites.

Tag Forum Creation

Figure 2:
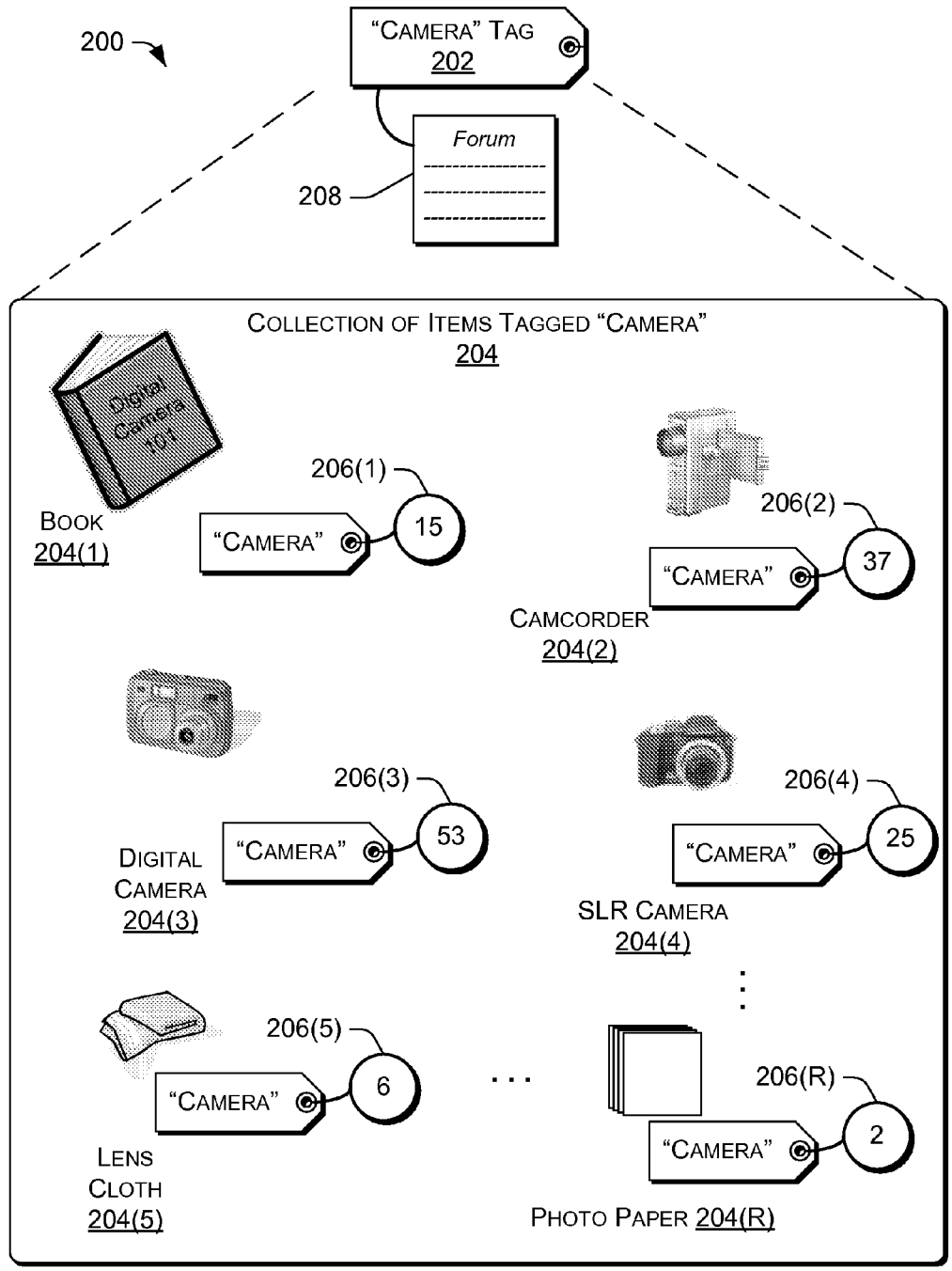
FIG. 2 illustrates an example implementation of a particular tag having a tag forum and multiple associated items.

While FIG. 1 illustrates that the single item record 118 may associate with multiple tags 118(1)-(P), each having an associated tag forum 120(1)-(P), FIG. 2 illustrates an example architecture 200 where a single tag 202 may have a tag forum and multiple associated items. FIG. 2, therefore, illustrates an implementation in which the tag 202 entitled "camera" corresponds to a collection 204 of items tagged "camera." This correspondence represents that one or more of the customers 102, the website operator, or some other entity has previously tagged each of the item records 204(1)-(R) with the camera tag 202. As discussed above and as illustrated, item records may represent any item that may be sold or otherwise listed on website 106. Illustrative item records associated with the camera tag 202 in this example include a book 204(1), a camcorder 204(2), a digital camera 204(3), a SLR camera 204(4), a lens cloth 204(5), and photo paper 204(P).

Also as illustrated, each of the item records 204(1)-(R) may include or otherwise correspond to tag data 206(1)-(R) for the camera tag 202. In some instances, the tag data 206(1)-(R) may include a tag score, such as those disclosed in U.S. patent application Ser. No. 11/750,782 entitled "Tag Scoring for Elements Associated with a Common Tag," filed on May 18, 2007, which is hereby incorporated by reference. Additionally or alternatively, the tag data 206(1)-(R) may indicate a relevancy between the item and the tag and/or may provide information related to the associated item. In some instances, the additional tag information may include the number of times the tag has been associated with the particular item (e.g., tag concordance). For example, the book 204(1) may be have been "tagged" with the tag "camera" fifteen times, creating the associated tag data 206(1) representing the number of times the item has been associated with that particular tag.

In addition, each item 204(1)-(R) includes item data. For example, items 204(1)-(R) may include, without limitation, sales data, sales rank, availability, date listed, click rate, and other item related information. In addition, a user's click stream may be analyzed when the user navigates through the website 106. The click stream may associate items, tags, or other elements to one another by determining the stream (or sequence) of web pages viewed by the user. The downstream click stream may include web pages, associated items, and the like, that are viewed after a particular web page is viewed by the user. Similarly, an upstream click stream may include web pages viewed before a particular web page is viewed by the user. The application of tag data 206(1)-(R), data related to items 204(1)-(R), and click stream data will be discussed further in the subsequent sections of the present disclosure.

As discussed above, each tag may include a tag forum 208. The tag forum 208 facilitates user discussions regarding aspects associated with the tag or tagged items. The tag forum 208 may allow users to post comments, ask questions, or otherwise share information related to the associated tag. For example, in the tag forum 208 for the camera tag 202, the tag forum may include a first discussion related to the best camera for a particular price range while a second discussion may relate to desirable accessories for a camera. The discussions may or may not directly relate to the items containing the tag. For example, in FIG. 2, the tag forum 208 discussion may not apply to all the items that include the tag 204(1)-(R), while some discussions may identify particular items in the tag forum.

Figure 3:
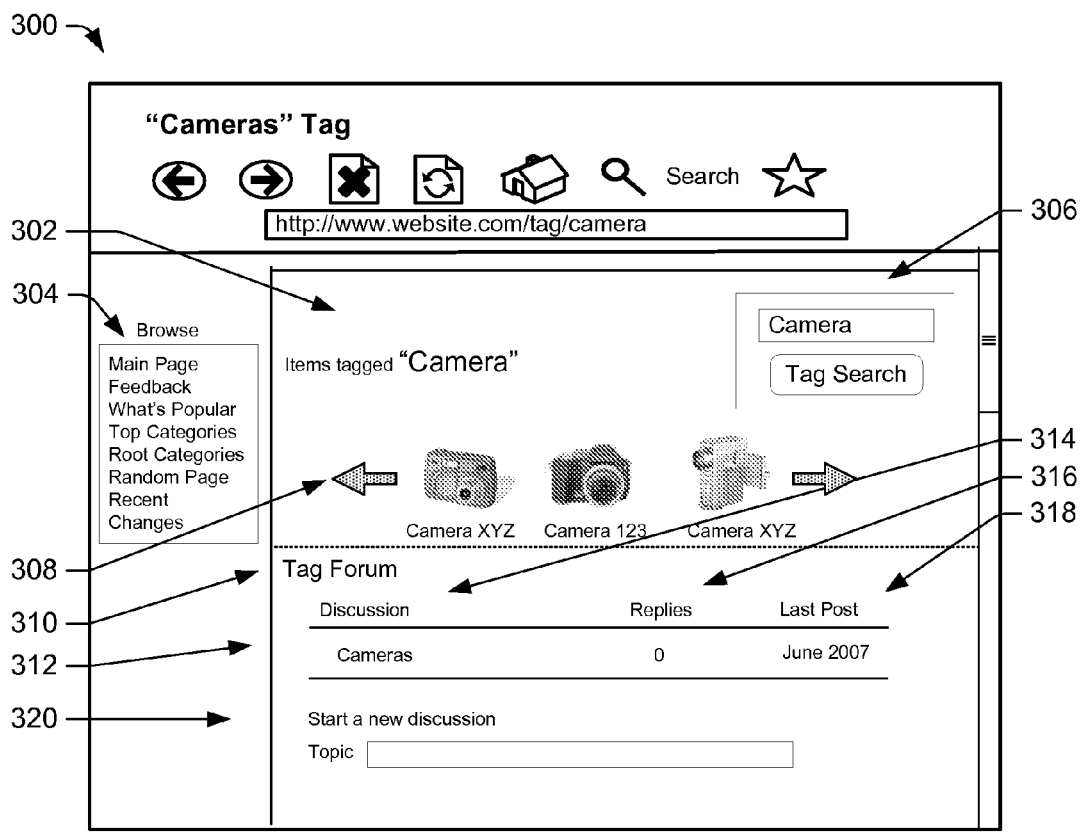
FIG. 3 illustrates an example screen rendering of a tag page for displaying items associated with a particular tag and displaying a tag forum section.

FIG. 3 illustrates an example screen rendering of a tag web page 300 for displaying items associated with a particular tag and displaying a tag forum section. Some or all tags may have their own tag web page 300 where a user may access information about the tag, items related to the tag, and a tag forum. For example, the URL "http://www.website.com/tag/camera" may be the web page location of the camera tag.

The tag web page 300 includes a title pane 302 with a title or other informative text. The tag web page 300 may include controls or navigation tools, such as a list of navigation hyperlinks 304 and a tag search tool 306. The tag search tool 306 allows the user to search and locate item records within the item catalog 112 and associated with a particular tag. In the illustrated example, the user conducts a tag search for the tag labeled "camera." The tag web page 300 may also include an items section 308 illustrating items associated with the corresponding tag, such as items tagged "camera." The items section 308 may allow a user to identify other items with the same tag and hyperlink to each item's web page.

As shown in FIG. 3, the tag web page 300 for the camera tag may include a section with a tag forum 310 which includes a discussion list 312. The discussion list 312 may include information about the discussions. In some instances, the discussion list 312 may include the name of the discussion 314, the number of replies 316 (or posts), and the last post 318, among other information associated with the discussions within the tag forum. The related information may be displayed with the discussion to inform the user of the discussion's relevance. Additionally, the related information may be used to sort or remove the discussion from a particular forum, such as if the discussion is inactive for a predetermined period of time.

Additionally, a prompt 320 labeled "start a new discussion" (or similar prompt) may allow a user to begin a new discussion within the tag forum 310. For example, a user may enter "basic camera question" as a title for a discussion at the prompt 320 when the user seeks feedback from other users on a simple camera question. In some instances the tag forum 310 may not contain a discussion and thus not include discussion listing 312, such as during the period between the creation of the tag forum and the creation of the first discussion. In such instances, the tag forum section 310 may only include the prompt 320 that allows the user to create a new discussion.

Figure 4:
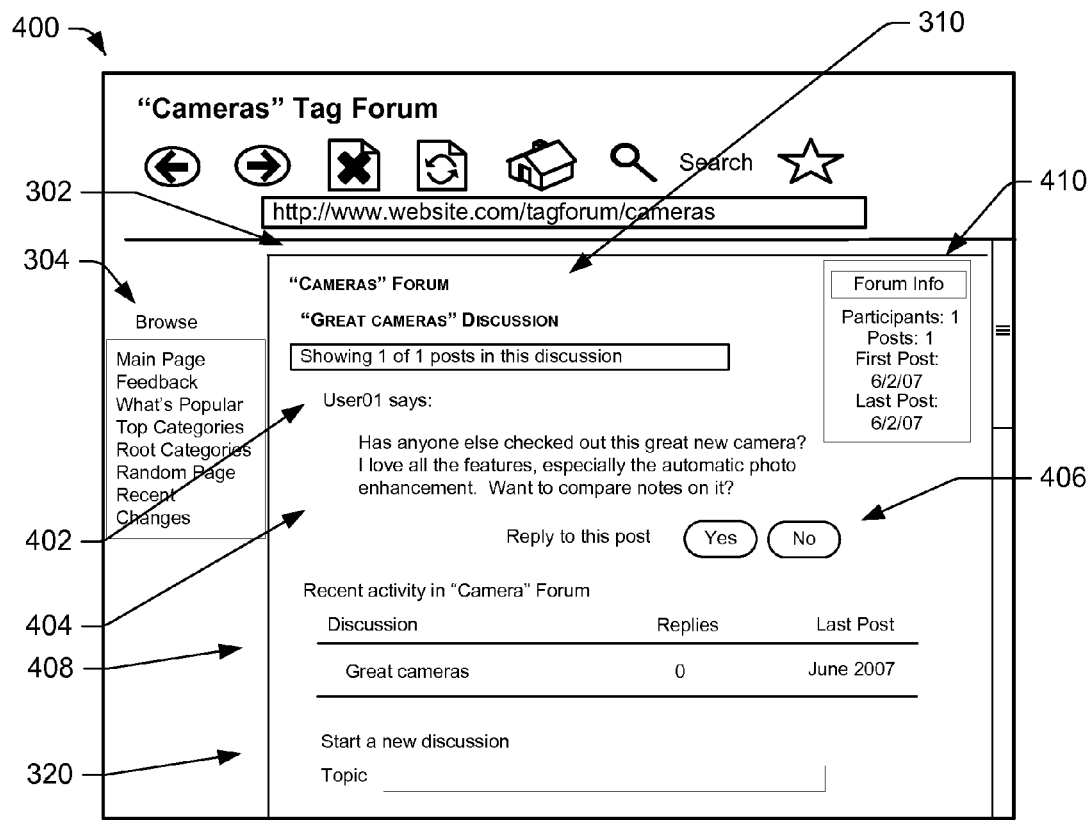
FIG. 4 illustrates an example screen rendering of a tag forum that lists posts in a tag forum and other forums related to the associated tag.

FIG. 4 shows a rendering of a tag forum web page 400 served in response to a user's request for a discussion listed in the tag forum 310, as illustrated in FIG. 3. The tag forum web page 400 includes a discussion 402 including discussion text 404 and a reply section 406. The tag forum web page 400 also includes a recent activity section 408 that may list the discussions for the particular tag forum 310, including any related information for the discussions. The tag forum web page 400 may also include a forum information box 410 to display information related to the discussion 402.

The tag forum 310 may be created automatically for each tag. In some instances, the tag forum 310 may be generated at the same time the tag is created or when the tag web page 300 is created. In such instances, many tag forums may be created automatically on the website 106, particularly if the website includes a large electronic item catalog 112. In other instances, tag forums 310 may be selectively created for certain tags. For example, it may be desirable only to create the tag forum 310 for popular tags or tags that have more than one item, thus improving the likelihood the tag forum will be used and contain information helpful for a customer or user.

The tag forums may be selectively created based on information other than user interactions. For example, a tag forum may be created on a tag web page 300 when the items tagged reach a particular sales quantity or dollar amount. For example, the tag forum may be created when a tag is associated with one or more items that have combined sales quantities surpassing a predetermined level (e.g., more than 500 sales). Alternatively, or in combination, other information that does not directly include user interactions may be used to selectively create tag forums.

In still further aspects, the tag forums may be selectively created based on user activity associated with the tag. This may include utilizing information related to the tag, such as a tag score, a number of items tagged with the tag, or total number of tag associations for a particular item. Further, the information related to the tag may be used in proportion to item information such as item sales, item click rate, or other indicators of the association strength between a tag and one or more items. The information related to the tag and/or item information may be analyzed during a prescribed time range such as during the last year, month, or other time range. As discussed, the tag forum creation may be performed using a number of techniques. In some instances, one or more techniques may be used either singly or in combination with the other techniques to provide the desired tag creation result.

In an illustrative technique, tag forums may be created based on a number of times the tag has been associated with tagged items. For example, a tag may be associated with a first item five times and associated with a second item ten times, thus having fifteen total tag associations. A criterion may be established by a website operator, or similarly situated person, to create a tag forum when the tag association, or tag concordance, is greater than or equal to ten. This may result in the creation of more useful or desirable tag forums as compared to creating tag forums for all tags regardless of the number of tag associations.

In some circumstances, it may be desirable to remove tag forums from the merchant's electronic catalog website 106. For example, tag forums may be irrelevant, inaccurate, offensive, out of date, or otherwise undesirable for inclusion on the website. Therefore, the website may include automated processes to remove tag forums. In one aspect, tag forums may be removed when the associated tag is removed. For example, if the tag is recalled by a website operator or based on user input, the recalled tag's corresponding tag forum may also be recalled. In another aspect, tag forums may be removed due to inactivity, which can be based on the frequency of user posts and/or user views, among other indices. In some embodiments, one or more users, or other people interacting on the website 106, may decide to remove a tag forum. For example, the tag forums may be automatically generated for each tag and then selectively removed by an editor. Alternatively, or in combination, the tags may be removed by user input, such as by a user vote. Users may also be empowered to create tag forums. For example, a tag web page 300 may include a link inquiring, "Should this tag include a forum?" to which the user may select "yes" to create a corresponding tag forum.

Tag Forum Placement

Once the tag forum 310 is created, either automatically or selectively, the tag forum may surface (or be placed) at one or more locations within the merchant's electronic catalog website 106. For example, the tag forum 310 may be automatically placed at the tag web page 300, as shown in FIG. 3, while the tag forum may also be placed on web pages for some or all of the items associated with the tag and/or on web pages for other tags.

Figure 5:
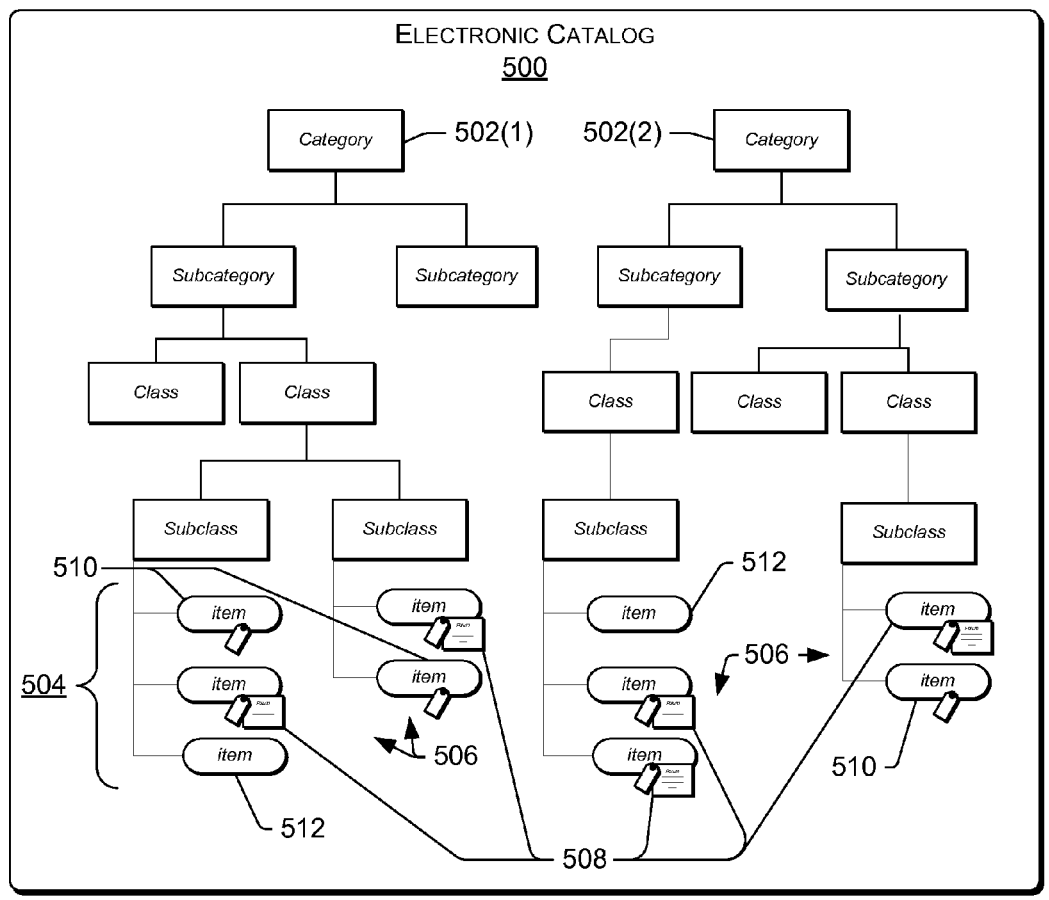
FIG. 5 illustrates an electronic catalog including items arranged in a hierarchy. Some items include associated tags while others include both associated tags and tag forums accessible from the item web page.

FIG. 5 illustrates an electronic catalog 500 including items arranged in a hierarchy. Some items include associated tags while others include both associated tags and tag forums accessible from the item web page. The hierarchy of the electronic catalog 500, including levels such as category, subcategory, class, subclass, and the like, may not correlate with the item tagging structure generated when users selectively tag items in the electronic catalog. Stated another way, a tag 202 may be associated with a portion of the items under a first category 502(1), while additionally including a portion of the items from a second category 502(2). In some instances, the items may be included under additional categories. For example, a waterproof camera may be listed under a camera category and a diving category and may be tagged "water photography."

Items 504 may be scattered throughout the electronic catalog 500. Some items 504 may include a particular tag association and thus be tagged items 506. In addition, a portion of the tagged items 506 may include a tag forum 508 associated with the item web page (e.g., by a hyperlink to a tag forum web page) while other items may not include a tag forum, such as tagged items 510. In addition, some items similarly situated with tagged items may be non-tagged items 512, despite the hierarchical relationship between the tagged and non-tagged items. For example, an Olympus® Stylus 1000 camera may be tagged "Stylus 1000", while a similarly situated item in the electric catalog 500 hierarchy, such as an Olympus® Stylus 710, may not be tagged with the "Stylus 1000" tag despite the hierarchical relationship between the items.

One aspect of tag forums includes the cross-item relationships created by tags that do not necessarily correspond to other item classifications or hierarchies. This allows a tag forum to include unique item relationships that are independent from traditional item classifications or hierarchies. For example, a tag may be called "Nikon" and include items such as cameras made by Canon. The tag 202 may include a tag forum with a discussion entitled "Nikon vs. Canon," where the discussion relates to user dialogue on whether an inquiring customer should buy a Nikon® or a Canon® camera. Customers may find this forum exceptionally helpful when choosing between these two camera brands. However, this forum may not be appropriately hyperlinked to each item containing the camera tag because it may not be relevant to some items, such as a Sony® camera item that includes the tag.

Tag forum placement may be determined independent of tag forum generation, or it may be determined in conjunction with tag forum creation. In some instances, tag forum placement may depend on whether a forum is created, as described above. For example, the logic defining whether a particular item should include a tag forum may result in triggering a value corresponding to "place tag forum" with a particular item. However, the logic defining whether the tag forum should be created for the particular tag may result in a value corresponding to "do not create." Therefore, in the aforementioned example, the tag forum would not be placed on the item web page because the forum was not created. Similarly, a forum may be created but not placed on a web page because the placement criteria have not been met. Tag forum placement is discussed in further detail below.

In some aspects, tag forum placement may be based on something other than user interaction. For example, tag forums may be placed on every item page automatically. Tag forums may also be placed on item web pages based on item sales (e.g., quantity, total dollars, etc.), sales rank, or other relationships with the item. For example, if a first item is purchased more frequently than a second item, the first item may be more likely to include the tag forum. The tag forums may additionally or alternatively be placed on item web pages based on user interaction. For example, a tag score for a particular item may indicate whether a tag forum is placed on an item web page. The number of times a tag is associated with an item (tag concordance), either during a fixed or infinite period of time, may also be used to determine tag forum placement. In some instances, the top items associated with a particular tag may include the tag forum hyperlinked to the item web page. For example, the items most commonly tagged with the particular tag may include the tag forum, such as the top twenty percent of the tagged items, top three items, or some other criteria for selecting which items should include tag forums on the item web page. Generally, techniques for placing tag forums on item web pages, or other locations, may be used either singly or in combination with other techniques for placing tag forums to achieve a desirable tag forum placement throughout the website 106. Optimal tag forum placement may benefit the electronic item catalog website by avoiding cluttering valuable space on item web pages with undesirable tag forums.

The tag forum placement on the item web pages may be determined by using absolute or normalized (relative) criteria for an item. For example, if a first item has 1000 units sold and has been tagged five times, the per unit tag value for the first item may be calculated as 200 units/tag, while a second item has ten units sold and has been tagged five times, the per unit tag value for the second item may be 2 units/tag. Under an absolute criterion that requires total units sold to be greater than 500 units, only the first item would include the tag forum. Under a normalized criterion using the units/tag, only the second item would include the tag forum if the unit/tag criteria was less than 100 units/tag. Generally speaking, normalization may associate a tag forum with an item that is tagged relatively few times when the normalized criterion meets a predetermined threshold value used to determine placement of the tag forum.

In still further aspects, the upstream click stream of web pages viewed by a user may be analyzed to determine the items a user viewed before entering a tag forum. Those items may then be hyperlinked to the tag forum. Similarly, the downstream click stream may be analyzed to determine the items a user views after leaving the tag web page.

In an illustrative technique, tag forums may be placed within an item web page after a user clicks on the item from the tag web page. For example, a user may follow a tag hyperlink from a first item to access the tag web page. While browsing the tag web page, the user may discover an interesting second item in the items section 308 which the user may then select to hyperlink to the second item's web page. The selection of the second item may initiate placement of the tag forum from the associated tag within the second item's web page. In other aspects, the tag forum may only be placed on the second item's web page if the user visited the respective tag forum before entering the second web page, thus incorporating click stream information in the tag forum placement.

In some instances, user (e.g., customer) purchase history, tag usage, discussion participation, and other user specific interactions may be used to determine tag forum placement. Techniques may facilitate providing a user specific tag forum presentation based on the user's interactions with a website. For example, a first user who enjoys rock music and has a transaction history which includes rock music purchases may be presented with more rock music related tag forums than a second user who prefers folk music and purchases more folk music. Therefore, when the first user views the website, he may be presented with different tag forums than when the second user views the website. In some instances, user tag forum presentation may involve logging into a user account to initiate personalization of the tag forums.

Figure 6:
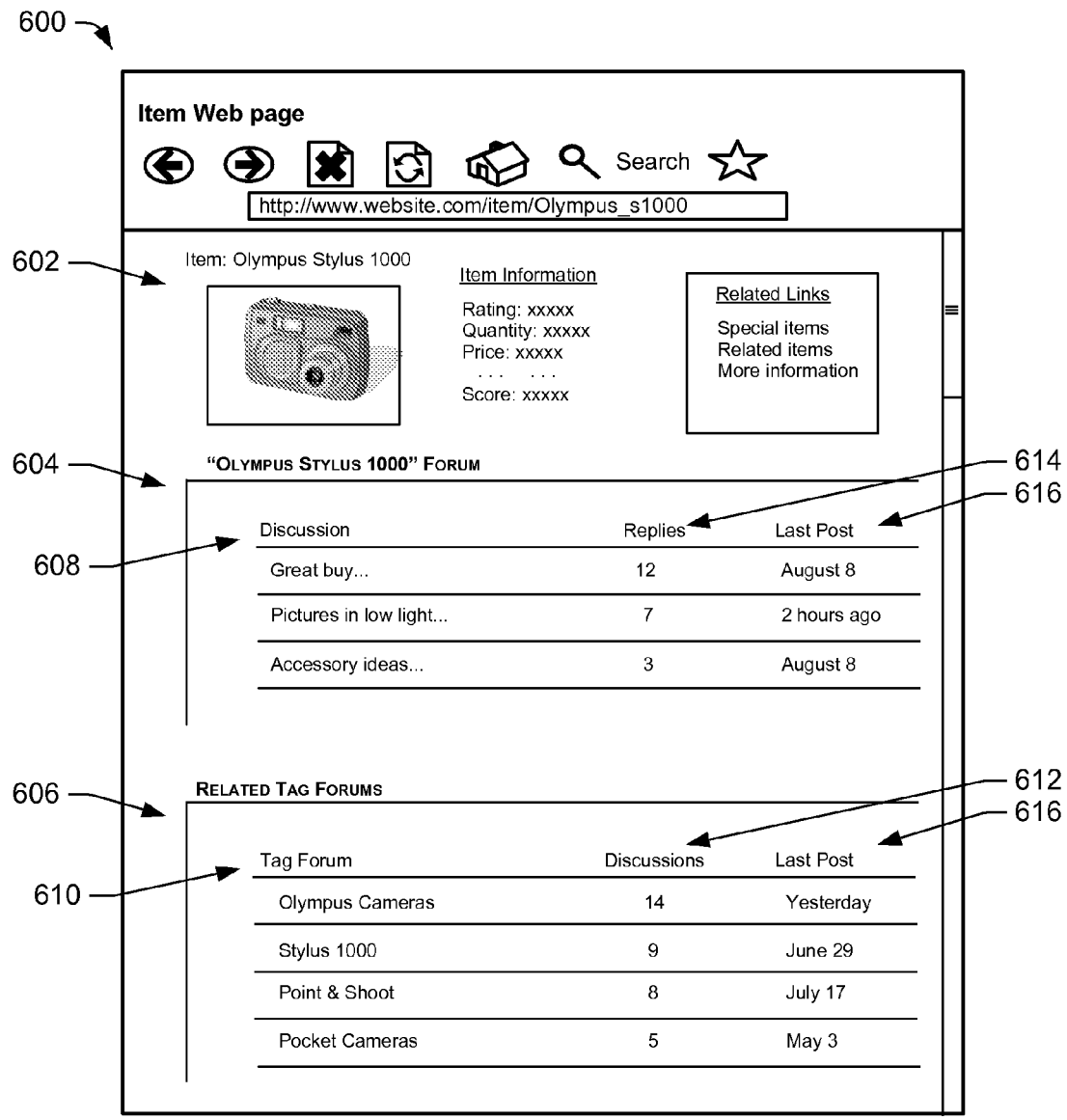
FIG. 6 illustrates an example screen rendering of an item web page including an item forum and a related tag forum.

FIG. 6 illustrates a screen rendering of an item web page 600. The item web page 600 may include item information 602, item forums 604, and related tag forums 606. The item forums 604 generally include discussions 608 that relate directly to the item displayed on the item web page 600. In contrast, the related tag forums 606 may include broader or more general discussions, such as discussions related to a user defined classification (i.e., tag) of the item. For instance, a discussion in the item forums 604 may include "pictures in low light" which includes dialogue from users about that particular item's operation in low light (i.e., Olympus® Stylus 1000 operation in low light). In contrast, a discussion in the related tag forums 606 may include a discussion on all Olympus® cameras and may include a general discussion or assessment of that particular brand of camera, including discussions on other model numbers.

As shown in FIG. 6, the related tag forums 606 may list tag forums 610 and provide a hyperlink to the tag forum discussions. If the tag forum 610 is selected, the user may have access to a variety of discussions within the selected tag forum (not shown in FIG. 6). For example, a tag forum 610 may have multiple discussions 612 within the tag forum. As illustrated in FIG. 6, the tag forum "Point & Shoot" may include eight discussions. The item forums 604 may display the number of replies 614 to inform the user of the discussion's overall activity. In addition, other related information such as the last post 616 may be identified to further inform users about the discussion's activity. In some instances, the tag forum 610 may be arranged in the related tag forums 606 based on the number of discussions in the tag forum. For example, tag forums 610 that include the greatest number of discussions may be placed at the top of the list of related tag forums 606.

Figure 7:
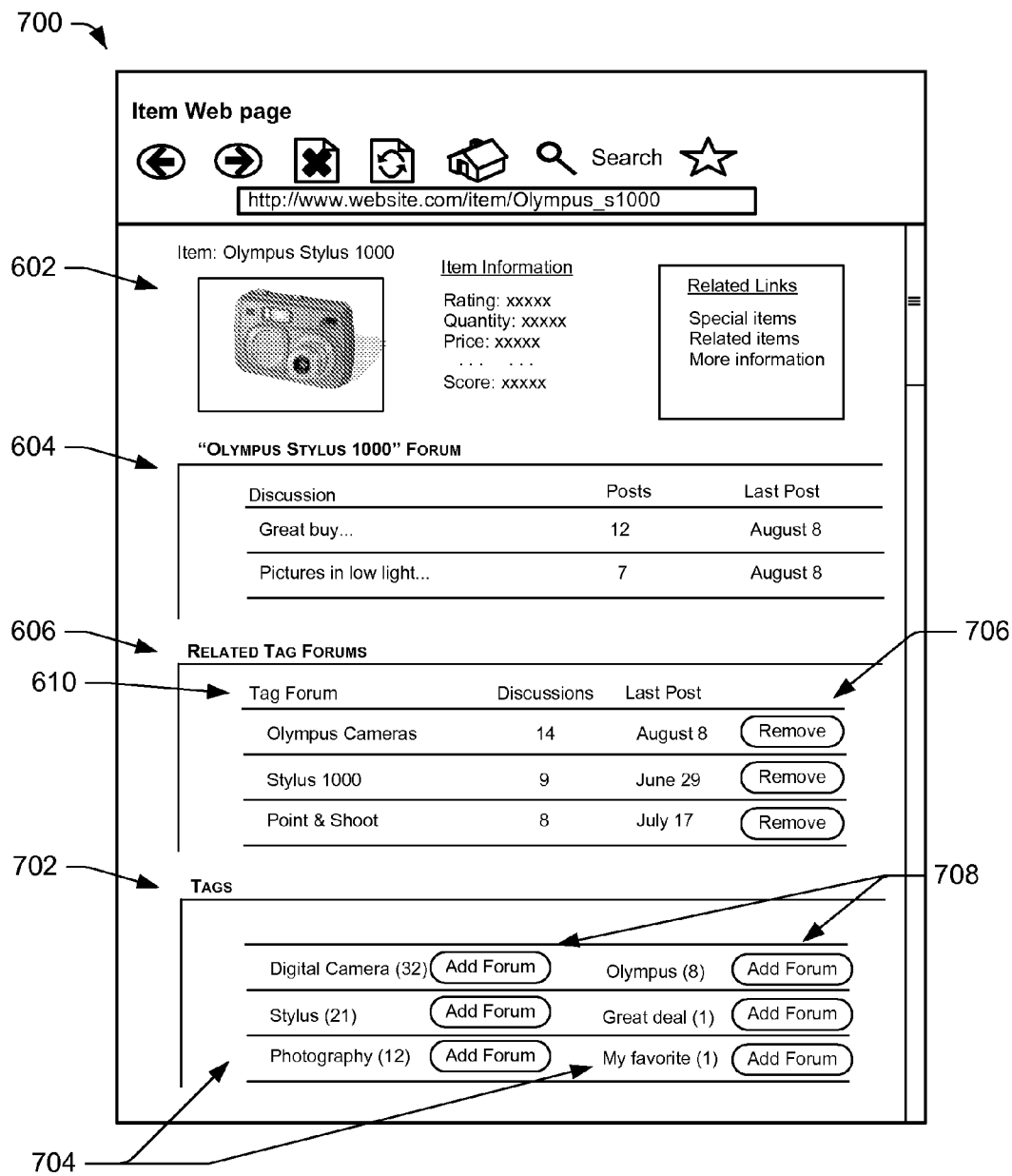
FIG. 7 illustrates another screen rendering of another item web page including user input features for creating and removing tag forums on the item web page.

FIG. 7 illustrates a screen rendering of another item web page 700 including user input features for creating and removing tag forums 610 on the item web page. In addition to including the item forum 604 and the related tag forums 606, the web page 700 may include a tag section 702 that displays the tags 704 associated with the item depicted on the item web page.

In some aspects, merchants may desire to directly or indirectly solicit customer input via the electronic catalog website 106 to assist in tag forum placement within the website. In some instances, the users may be prompted to identify tag forums 610 that are appropriate for a particular item web page. User control over the placement of tag forums may remove the need for, or assist, an editor to place, screen, or otherwise edit the tag forum placement on a website.

In the illustrative screen rendering of web page 700, the related tag forums 606 may provide a user input section 706 that allows users to selectively remove tag forums 610 that are not appropriate for a particular item. In some aspects, the users may vote to remove a particular tag forum, therefore, minimizing the impact a single user may have to alter the item web page 700. For example, the particular tag forum may be removed after five users vote to remove the tag forum. Alternatively, or in addition, users may choose which tag forums they would like to view on a user specific presentation, (e.g., when a user is logged in under an account, etc.). An aggregate of user decisions may also be displayed which combines aspects of individual user preferences. The user input section 706 may allow users to remove tag forums because the tag forum may lack quality, be inappropriate, or for some other reason.

As discussed above, the tag section 702 includes at least a partial list of the tags 704 associated with the particular item on the web page 700. Each tag 704 may include a related user input option 708 that may allow users to add tag forums associated with tags 704 to the related tag forums 606. For example, a user may wish to include the digital camera forum in the related tag forums 606 of the item web page 700. The user may select the user input option 708, such as an "add forum" function, which may add the digital camera forum into the related tag forums 606.

In some aspects, the user input option 708 may allow a user to vote for a tag forum, or otherwise increase the likeliness that the tag forum will be displayed within the related tag forums 606. For example, if a specified number of users click on "add forum" for the tag 704 called "digital cameras," the digital tag forum may eventually be added to the related tag forums 606 based on the user input. Similarly, users may vote against adding the tag forum to the item web page. As discussed above, users may also add or remove tag forums from the user specific presentation. Aggregate user information may also be used to facilitate determining which tag forums are selected (or deselected) for display on a web page.

In some embodiments, the tag forum may also be placed on web pages for other tags. For example, a tag forum "marathon" may be placed on a tag page for "running." This technique may be helpful to provide additional discussions on a tag page, or other web page, such as an instance when the marathon tag forum includes related discussions while a running tag forum does not include a discussion or includes fewer discussions than the marathon tag forum.

Item Manager and Tag Forum Implementation

Figure 8:
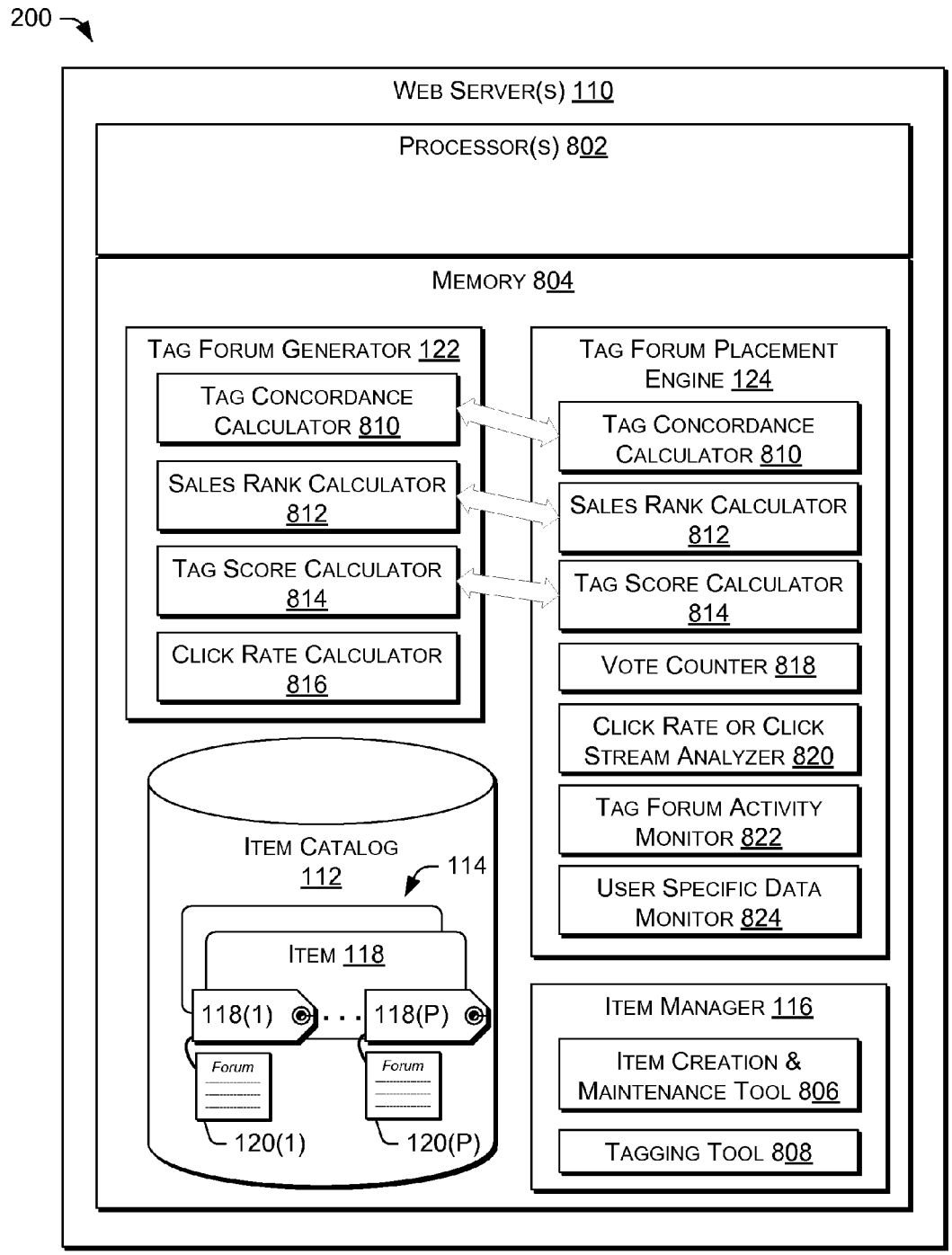
FIG. 8 is a block diagram illustrating embodiments of modules in an item manager, tag forum generator, and tag forum placement engine from FIG. 1.

FIG. 8 illustrates an example implementation 800 of the item manager 116, the tag forum generator 122, and the tag forum placement engine 124 that are run as software on one or more of the web servers 110(1)-(N). The web servers have processing capabilities and memory suitable to store and execute computer-executable instructions. In this example, the web server(s) 110 include one or more processors 802 and memory 804. The memory 804 may include volatile and/or nonvolatile memory, removable and/or non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device.

The item manager 116, the tag forum generator 122, and the tag forum placement engine 124 are implemented as software or computer-executable instructions stored in the memory 804 and executed by one or more of the processors 802. The item manager 116 includes an item creation and maintenance tool 806 to facilitate creation and maintenance of the item records 114 in the item catalog 112. Such items may be created and posted by the website operator (e.g., an owner of a merchant website), the manufacturer, distributor, retailer, or the like. The item manager 116 further includes a tagging tool 808 that enables a user to associate one or more tags with an item within the item catalog 112. The tagging tool 808 may also enable the user to first define one or more of the tags.

The tag forum generator 122 and the tag forum placement engine 124 each may include a multitude of modules. In some instances, the tag forum generator 122 and the tag forum placement engine 124 may include similar or identical modules and may also share modules.

With use of one or more of the illustrated modules, or one or more non-illustrated modules, the tag forum generator 122 generates a tag forum for a particular tag, such as after the tag is created and associated with a particular item and item record. The tag forum generator 122 is first shown to include a tag concordance calculator 810. The tag concordance calculator 810 serves to monitor and store a number of times that a particular tag has been associated with a particular item record. A tag with a high tag concordance may have a tag forum generated for that tag.

The tag forum generator 122 also includes a sales rank calculator 812, a tag score calculator 814, and a click rate calculator 816, each of which may be used alone or in combination, by the tag forum generator 122 to initiate the creation of a tag forum for the tag. The sales rank calculator 812 serves to monitor and store sales data for items within item catalog 112, and thus associated with a tag. With this data, the sales rank calculator 812 may calculate a relative sales rank for a particular item (and/or tag), or other relevant information to initiate the creation of a tag forum for the tag. The tag score calculator 814 may calculate a tag score associated with the tag to provide a relative strength or association between a tag and an item. The click rate calculator 816 tracks a click rate or a click count for item records, tags, or the tag forum, which again may be used to generate tag forums or remove tag forums which are inactive.

The tag forum placement engine 124 places a tag forum for a particular tag after the tag forum has been generated by the tag forum generator 122 with use of one or more of the illustrated modules, or one or more non-illustrated modules. The tag forum placement engine 124 is first shown to include the tag concordance calculator 810, the sales rank calculator 812, and the tag score calculator 814, which are also described and illustrated within the tag forum generator 122. As discussed above, these modules may be implemented one or more times in the memory 804, while in some instances these modules may be shared between the tag forum generator 122 and the tag forum placement engine 124.

The tag forum placement engine 124 also includes a vote counter 818, a click rate or click stream analyzer 820, and a tag forum activity monitor 822, each of which may be used alone or in combination, by the tag forum placement engine 124 to initiate the placement of a tag forum on one or more web pages. The vote counter 818 tracks the user input or votes (discussed above in reference to FIG. 7) for each tag forum as it associates with a particular item web page or other web page. These votes may influence the placement of tag forums in the manner discussed above. The click rate or click stream analyzer 820 tracks a click rate for item records, tags, or the tag forum, which again may be used to place tag forums or remove tag forums from web pages. The click stream analysis may be used to determine where tag forums should be placed based on web pages accessed either upstream or downstream from the tag forum. The tag forum activity monitor 822 may remove a tag forum from a location if it is inactive, while it may also place a tag forum on additional web pages if the tag forum has a relatively large amount of activity (e.g., high click rate) as compared to other tag forums.

The tag forum placement engine 124 may also include a user specific data monitor 824. The user specific data monitor 824 may monitor user specific data such as purchase history, tag usage, discussion participation, and other user specific interactions that may be used for determining tag forum placement for a user.

Operation

Figure 9:
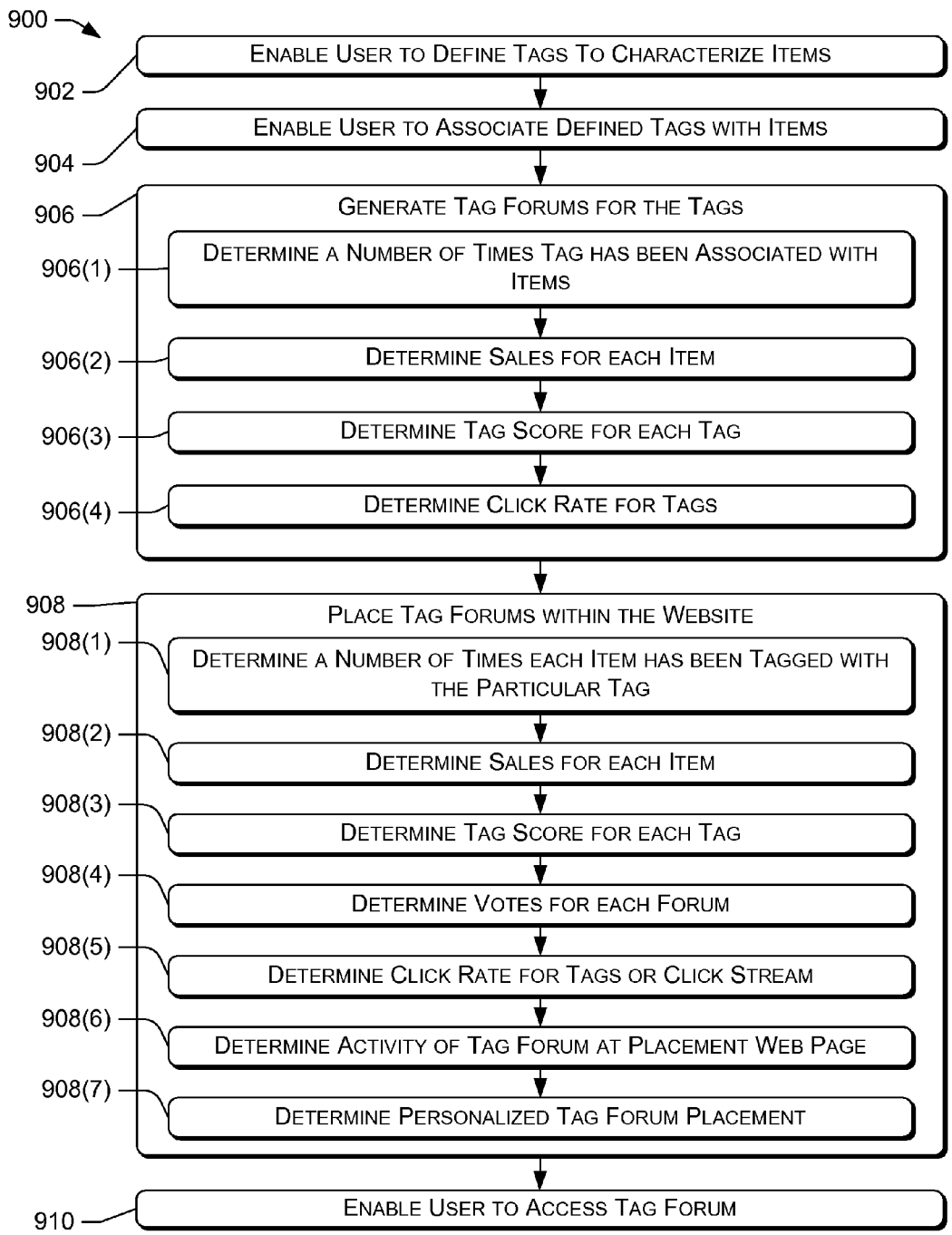
FIG. 9 is a flow diagram of an embodiment of a process for creating tag forums from a particular tag and placing the tag forums on an electronic catalog website.

FIG. 9 illustrates an example process 900 for tagging items with a particular tag, generating tag forums and placing tag forums within an electronic catalog website 106. The process 900 is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

For discussion purposes, the process 900 is described with reference to the architecture 100 of FIG. 1, as well as the item manager 116, the tag score generator 122, and the tag score placement engine 124 of FIGS. 1 and 8. In particular, many acts described below may be implemented and performed by the tag forum generator 122 and the tag forum placement engine 124 illustrated in FIGS. 1 and 8, and particularly subcomponents of these elements as shown in FIG. 8.

The process 900 includes operation 902, which enables a user (e.g., one of the customers 102) to define one or more tags to characterize one or more items in an item catalog. Operation 904 represents enabling the user to associate defined tags with items in the item catalog.

Next, FIG. 9 shows that operation 906 generates tag forums for the tags associated with particular items, and includes a series of sub-operations 906(1), . . . , (4). Sub-operation 906(1) determines a number of times that each tag has been associated with items. Again, a higher concordance of tags may serve to initiate the creation of a tag forum for a particular tag. Sales for each item associated with the particular tag may then be determined at sub-operation 906(2). In some instances, the sales may be combined for each item associated with the tag to create a tag sales value. The sales may be calculated absolutely or relative to other items tagged with the particular tag. In some instances, higher sales may correlate to higher demand for an associated tag forum. Sub-operation 906(3) determines the tag score for each tag. The tag score may relate to popularity of a tag, and thus indicate when creating tag forum may be desirable. Finally, sub-operation 906(4), represents determining a click rate or count for each item associated with the particular tag. In other instances, the click rate may count each click on a tag, therefore representing the tag popularity from a tag web page.

Operation 908 includes placing tag forums within the merchant's electronic catalog website, and includes a series of sub-operations 908(1), . . . , (6). Sub-operation 908(1) determines a number of times that each item has been tagged with the particular tag. A higher concordance of tagging may serve to initiate placing a tag forum within a particular item web page. Similar to sub-operations 906(2)-(3) relating to tag forum generation, sub-operations 908(2)-(3) may assist in placing the tag forums within item web pages, such as with items that include higher sales or have a high tag score compared to other items having the same tag. For example, the top three items by sales and tag score may include the tag forum within their respective item web pages.

Sub-operation 908(4) determines (e.g., tallies) votes for each tag forum. In some instances, the tag forums may be added or removed by one or more votes from users. These votes may voice a voter's opinion as to whether the particular tag forum is appropriate for the tagged item. Sub-operation 908(5) represents determining a click rate or count for each tag associated with the particular item. In other instances, the click rate may count each click on a tag, therefore representing the tag popularity from an item web page. Tags with high click rates may have tag forums placed within the item web page. In addition, sub-operation 908(5) may include click stream analysis, as discussed above. For example, the upstream click stream of a user that leads the user to the tag forum may provide one or more web pages in which it may be desirable to place the tag forum. Similarly, the downstream click stream of a user after entering a tag web page or tag forum may indicate web pages in which it may be desirable to place the tag forum. Sub-operation 908(6) represents determines the activity of the tag forum at the placement web page. For example, tag forum aging or inactivity may result in removal of a tag forum from a particular item web page. In addition, relatively high tag forum activity may indicate the tag forum should be placed with similar items that include the associated tag. Finally, sub-operation 908(7) determines personalized placement of tag forums. For example, a user specific presentation may include forums related to the user's transaction history, tag usage, or discussion usage.

With use of tag forums generated by operation 906 and placed by operation 908, a user may access the tag forums at an operation 910. By presenting the tag forums to the user based on generating the tag forums and placing the tag forums, the relevant and popular tag forums may be placed in the best locations within a website. For example, the tag forum may always be placed on a tag web page, while only well-correlated items containing the tag will also include user access to the tag forum. This approach to tag forum generation and tag forum placement may provide adequate access to tag forums while avoiding cluttering item web pages. Further, this process may remove the need for an editor to monitor tag forums for either creation or removal of the tag forums from web pages within a website. Users may, therefore, efficiently and effectively use tag forums to learn more about specific items and make educated decisions related to the items.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method comprising:
under control of one or more servers configured with computer-executable instructions:
associating an item with a tag in an electronic catalog, the electronic catalog including tag forums that are discussion areas to facilitate interaction between users of the electronic catalog;
determining that the tag has been associated with the item by an amount that has reached a threshold value, wherein the amount is a tag score;
when a tag forum has not been created for the tag, creating the tag forum in response to the tag score reaching the threshold value; and
when the tag forum has been created for the tag, presenting the tag forum on a page associated with the item or the tag in response to the tag score reaching the threshold value.

2. The method as recited in claim 1, wherein the item associated with the tag comprises an item for sale in the electronic catalog.

3. The method as recited in claim 1, wherein creating the tag forum is initiated by user activity associated with the tag.

4. The method of claim 1, wherein presenting the tag forum is initiated by user activity associated with at least one of the item or corresponding tag, the user activity determining whether to place the tag forum on the page associated with the item or the tag.

5. One or more tangible computer-readable media storing computer-executable instructions that, when executed on one or more processors, performs acts comprising:
associating a tag with an item in an electronic catalog, the electronic catalog including tag forums that are discussion areas to facilitate interaction between users of the electronic catalog;
determining that the tag has been associated with the item by an amount that has reached a threshold value, wherein the amount is a tag score;
when a tag forum has not been created for the tag, creating the tag forum in response to the tag score reaching the threshold value; and
when the tag forum has been created for the tag, presenting the tag forum on a page associated with the item or the tag in response to the tag score reaching the threshold value.

6. The one or more computer-readable media as recited in claim 5, wherein creating the tag forum further includes placing the tag forum on at least one web page to facilitate user interaction with the tag forum.

7. The one or more computer-readable media as recited in claim 5, wherein tag forum creation is performed based at least in part on user interaction.

8. The one or more computer-readable media as recited in claim 5, wherein tag forum creation is performed not on user interaction.

9. The one or more computer-readable media as recited in claim 5, wherein creating the tag forum comprises determining a click rate for the associated tag, the click rate representing how often the tag has been selected by one or more users.

10. The one or more computer-readable media as recited in claim 5, wherein creating the tag forum comprises personalizing a user specific presentation by placing a tag forum based on at least one of a user's transaction history, tag usage, or discussion participation.

11. The one or more computer-readable media as recited in claim 5, wherein the item associated with the particular tag comprises an item for sale in the electronic catalog.

12. The method as recited in claim 1, further comprising removing one or more of the tag forums based on inactivity of the one or more tag forums.

13. A system comprising:
one or more processors; and
memory storing computer executable instructions that, when executed by the one or more processors, cause the one or more processors to perform acts including:
associating a tag with an item in an electronic catalog, the electronic catalog including tag forums that are discussion areas to facilitate interaction between users of the electronic catalog;
determining that the tag has been associated with the item by an amount that has reached a threshold value, wherein the amount is a tag score;
when a tag forum has not been created for the tag, creating the tag forum in response to the tag score reaching the threshold value; and
when the tag forum has been created for the tag, presenting the tag forum on a page associated with the item or the tag in response to the tag score reaching the threshold value.

14. The system as recited in claim 13, wherein creating the tag forum further includes placing the tag forum on at least one web page to facilitate user interaction with the tag forum.

15. The system as recited in claim 13, wherein creating the tag forum comprises personalizing a user specific presentation by placing a tag forum based on at least one of a user's transaction history, tag usage, or discussion participation.

16. The system as recited in claim 13, wherein the item associated with the particular tag comprises an item for sale in the electronic catalog.

17. The system as recited in claim 13, wherein the acts further comprise removing one or more of the tag forums based on inactivity of the one or more tag forums.

* * * * *